(12) United States Patent
Mackin

(10) Patent No.: US 11,597,534 B2
(45) Date of Patent: Mar. 7, 2023

(54) AIRCRAFT LAUNCHING SYSTEMS AND METHODS

(71) Applicant: THE BOEING COMPANY, Chicago, IL (US)

(72) Inventor: Steve G. Mackin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 492 days.

(21) Appl. No.: 16/431,107

(22) Filed: Jun. 4, 2019

(65) Prior Publication Data

US 2020/0385145 A1  Dec. 10, 2020

(51) Int. Cl.
*B64F 1/08* (2006.01)
*B64C 39/02* (2023.01)
*B64F 1/10* (2006.01)

(52) U.S. Cl.
CPC .............. *B64F 1/08* (2013.01); *B64C 39/024* (2013.01); *B64F 1/10* (2013.01); *B64C 2201/082* (2013.01); *B64C 2201/084* (2013.01)

(58) Field of Classification Search
CPC ...... B64F 1/08; B64F 1/007; B64C 2201/082; B64C 2201/206; B64C 39/022; B64D 5/00
See application file for complete search history.

(56) References Cited

U.S. PATENT DOCUMENTS

| | | | | |
|---|---|---|---|---|
| 1,547,912 A * | 7/1925 | Hall | ........................ | B64D 5/00 244/2 |
| 1,716,670 A * | 6/1929 | Sperry | ..................... | B64D 5/00 244/2 |
| 1,784,954 A * | 12/1930 | Alvistur | .................... | B64D 5/00 244/16 |
| 1,792,738 A * | 2/1931 | Hall | ........................ | B64D 5/00 244/2 |
| 2,365,827 A * | 12/1944 | Liebert | .................... | B64D 5/00 244/2 |
| 2,399,216 A * | 4/1946 | Fahrney | ................... | B64D 5/00 244/2 |
| 2,843,337 A * | 7/1958 | Bennett | .................... | B64D 5/00 244/2 |
| 3,017,138 A * | 1/1962 | Flint | ........................ | B64B 1/40 244/3 |
| 3,759,330 A * | 9/1973 | Rainey | ..................... | B64D 1/16 169/53 |
| 4,678,141 A * | 7/1987 | Sarrantonio | ............ | B64C 37/02 244/2 |
| 4,889,297 A * | 12/1989 | Ikeda | ...................... | B64C 37/02 244/5 |
| 7,946,530 B1 * | 5/2011 | Talmage, Jr. | ........... | B64C 37/00 244/118.2 |
| 9,630,712 B1 * | 4/2017 | Carmack | .................. | B64D 5/00 |
| 9,764,839 B2 * | 9/2017 | Whitaker | ............. | A62C 3/0242 |
| 10,392,103 B2 * | 8/2019 | Bourne | ................ | B64C 39/024 |
| 10,913,534 B1 * | 2/2021 | Brum | ..................... | B64C 39/024 |
| 11,204,612 B2 * | 12/2021 | Von Flotow | ........... | G05D 1/104 |

(Continued)

*Primary Examiner* — Christopher D Hutchens
(74) *Attorney, Agent, or Firm* — The Small Patent Law Group LLC; Joseph M. Butscher

(57) ABSTRACT

An aircraft launching system and method include a first lifting sub-system including a first tether that removably couples to an aircraft, and a second lifting sub-system including a second tether that couples the first lifting sub-system to the second lifting sub-system.

21 Claims, 6 Drawing Sheets

(56) References Cited

U.S. PATENT DOCUMENTS

| | | | | |
|---|---|---|---|---|
| 2007/0187547 | A1* | 8/2007 | Kelly | B64B 1/20 244/7 R |
| 2009/0152391 | A1* | 6/2009 | McWhirk | B64B 1/02 244/30 |
| 2014/0251743 | A1* | 9/2014 | Childress | B64C 39/022 191/12 R |
| 2015/0115096 | A1* | 4/2015 | Rossi | B64C 27/26 244/2 |
| 2015/0314871 | A1* | 11/2015 | von Flotow | B64C 39/024 244/137.4 |
| 2016/0090179 | A1* | 3/2016 | Childress | B64C 39/024 244/63 |
| 2016/0318609 | A1* | 11/2016 | Lynn | B64C 3/16 |
| 2016/0355261 | A1* | 12/2016 | Chin | B64C 39/024 |
| 2017/0225784 | A1* | 8/2017 | Hayes | B64C 39/026 |
| 2017/0369169 | A1* | 12/2017 | Lee | B64D 5/00 |
| 2019/0071176 | A1* | 3/2019 | von Flotow | B64F 1/025 |
| 2019/0193827 | A1* | 6/2019 | Zerweckh | B64C 39/024 |
| 2019/0217952 | A1* | 7/2019 | Zawadzki | B64D 1/02 |
| 2019/0337640 | A1* | 11/2019 | Dennis | B64F 1/029 |
| 2019/0344679 | A1* | 11/2019 | Miller | G01C 21/3469 |
| 2020/0115054 | A1* | 4/2020 | Ryan | B64C 3/56 |
| 2020/0140121 | A1* | 5/2020 | Kim | B64F 1/222 |
| 2020/0361631 | A1* | 11/2020 | Leone | B64F 1/04 |
| 2021/0107685 | A1* | 4/2021 | Paz Duart | B64F 1/06 |

* cited by examiner

AIRCRAFT LAUNCHING SYSTEMS AND METHODS

FIELD OF EMBODIMENTS OF THE DISCLOSURE

Embodiments of the present disclosure generally relate to aircraft launching systems and methods.

BACKGROUND OF THE DISCLOSURE

Various aircraft depart from and arrive at airports. An airport typically includes at least one runway that accommodates aircraft taking off and landing. A runway is long enough to ensure that an aircraft is able to reach sufficient speed to take off, as well as provide ample space to land. As can be appreciated, runways take up substantial amounts of area.

Additionally, many aircraft generate noise as they take off from an airport. Areas surrounding and/or proximate to airports are subjected to such noise.

Further, aircraft typically consume a great deal of energy as they take off from an airport and ascend to a cruising altitude. Certain electric aircraft include numerous batteries. Energy within the batteries is used by the aircraft to take off and ascend to the cruising altitude, as well as to fly to a destination. The batteries used to provide energy required for the aircraft to take off and ascend to the cruising altitude add substantial weight to the aircraft, thereby requiring an increased amount of energy to travel between locations.

SUMMARY OF THE DISCLOSURE

A need exists for a system and a method for allowing an aircraft to depart from a location that takes up less space than a traditional runway. Further, a need exists for a system and a method that reduces aircraft noise at ground level. Additionally, a need exists for a system and method that enables existing onboard electrical storage capabilities to be used to extend a duration of a flight rather than being expended during the taxi, takeoff, and climb phases of a mission.

With those needs in mind, certain embodiments of the present disclosure provide an aircraft launching system that includes at least one lifting sub-system that lifts an aircraft to a first altitude and a second altitude that is greater than the first altitude. In at least one embodiment, the aircraft launching system includes a first lifting sub-system that removably couples to an aircraft and a second lifting sub-system that couples to the first lifting sub-system. In at least one embodiment, the first lifting sub-system is a crane that is configured to lift the aircraft to a first altitude, and the second lifting sub-system is a lighter-than-air aircraft that is configured to lift both the first lifting sub-system and the aircraft to a second altitude that is greater than the first altitude. Once at the second altitude, the aircraft is operated to reach a launch airspeed and detach from the first tether after reaching the launch airspeed.

In at least one embodiment, a power source supplies power to one and/or both of the first lifting sub-system and the second lifting sub-system. For example, the second lifting sub-system includes the power source. In at least one embodiment, the aircraft receives power from the power source. The power source may include one or more batteries.

Certain embodiments of the present disclosure provide an aircraft launching method that includes providing at least one lifting sub-system, and lifting, by the at least one lifting sub-system, an aircraft to a first altitude and a second altitude that is greater than the first altitude. In at least one embodiment, the aircraft launching method includes removably coupling an aircraft to a first tether of a first lifting sub-system, and coupling the first lifting sub-system to a second tether of a second lifting sub-system. In at least one embodiment, the aircraft launching method also includes lifting, by the first lifting sub-system, the aircraft to a first altitude, and lifting, by the second lifting sub-system, the first lifting sub-system and the aircraft so that the aircraft is at a second altitude that is greater than the first altitude. The aircraft launching method also includes operating the aircraft to reach a launch airspeed at the second altitude and detach from the first tether after reaching the launch airspeed.

In at least one embodiment, the aircraft launching method also includes supplying power, by a power source of the second lifting sub-system, to the first lifting sub-system, the second lifting sub-system, and the aircraft.

In at least one embodiment, the aircraft launching method also includes selectively deploying the first tether in relation to the first lifting sub-system, and selectively deploying the second tether in relation to the second lifting sub-system.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an aircraft launching system and method that includes a first lifting sub-system that is configured to removably couple to an aircraft through a first tether. A second lifting sub-system is configured to couple to the first lifting sub-system, such as through a second tether. The first lifting sub-system securely couples to the aircraft, such as through a hook at the end of the first tether, and lifts the aircraft to a first altitude. After the aircraft is lifted to the first altitude, the second lifting sub-system lifts the first lifting sub-system and the aircraft to a second higher altitude. At the second altitude, the aircraft is operated to reach a launch airspeed for detaching and launching from the first lifting sub-system. In at least one embodiment, the second lifting sub-system includes a power source, such as one or more batteries, that provides electrical power to the aircraft through the second tether and the first tether. The aircraft uses the energy supplied by the power source of the second lifting sub-system to attain a launch airspeed. As such, the aircraft may be provided with a power source of reduced weight, as the aircraft may not require its own power during takeoff or for reaching the launch airspeed. Optionally, the aircraft may utilize a power source having an increased quantity of batteries and utilize the additional electrical energy to extend the flight range of the aircraft.

In at least one embodiment, the first lifting sub-system includes a crane, and the second lifting sub-system includes an airship or dirigible such as a lighter than air heavy lift blimp or balloon. Optionally, the second lifting sub-system may be embodied as an unmanned aerial vehicle (UAV). Moreover, the aircraft being launched may be an all-electric aircraft, a hybrid-electric aircraft, an unmanned aerial vehicle (UAV), or any other type of aircraft.

Figure 1:
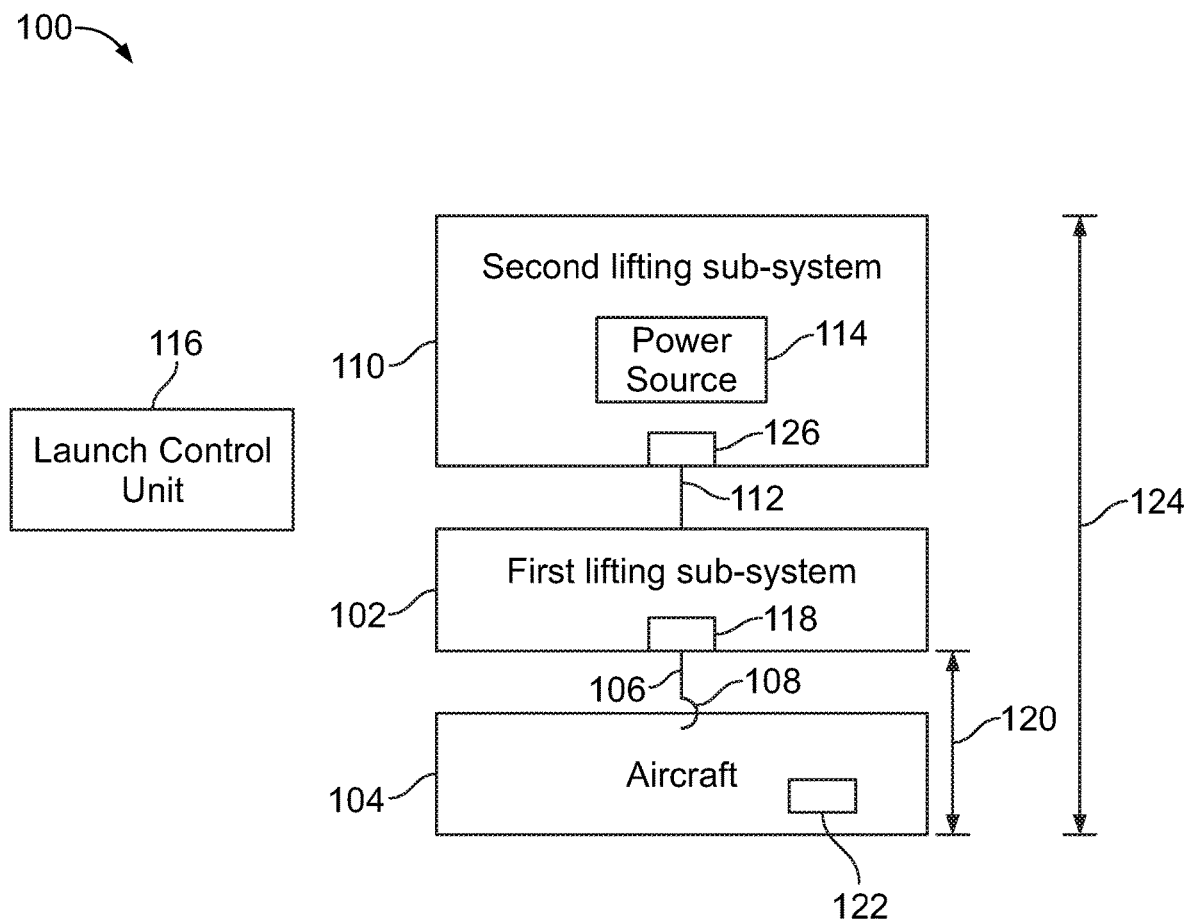
FIG. 1 illustrates a schematic diagram of an aircraft launching system, according to an embodiment of the present disclosure.

FIG. 1 illustrates a schematic diagram of an aircraft launching system 100, according to an embodiment of the present disclosure. The aircraft launching system 100 includes a first lifting sub-system 102 that removably couples to an aircraft 104 through a first tether 106, such as one or more cables. The first tether 106 mechanically couples to the aircraft 104 through a coupler 108, such as a hook, loop, clasp, jaw(s), and/or the like. In the exemplary embodiment, the aircraft 104 is an all-electric aircraft or a hybrid-electric aircraft, which can be flown using an internal combustion engine only, an electric motor only, or a combination of both engine and motor. In the exemplary embodiment, the first tether 106 provides an electrical connection, such as through integral electrical wires, with the aircraft 104. For example, the first tether 106 may be utilized to provide power to the aircraft 104 to enable the aircraft 104 to achieve launch speed prior to the aircraft 104 disengaging from the coupler 108.

A second lifting sub-system 110 couples to the first lifting sub-system 102 through a second tether 112, such as one or more cables. The second tether 112 mechanically couples the second lifting sub-system 110 to the first lifting sub-system 102. Additionally, in at least one embodiment, the second tether 112 provides an electrical connection to the first lifting sub-system 102, and therefore the first tether 106, such as through integral electrical wires.

The second lifting sub-system 110 includes a power source 114. In at least one embodiment, the power source 114 includes one or more batteries. In at least one other embodiment, the power source 114 includes a fuel-powered engine-generator. Energy from the power source 114 is thus used to provide power to the first lifting sub-system 102 and the aircraft 104. In at least one embodiment, energy from the power source 114 is supplied to the aircraft 104 via the first and second tethers 106 and 112, respectively.

In at least one embodiment, the aircraft launching system 100 also includes a launch control unit 116 in communication with the first lifting sub-system 102, the second lifting sub-system 110, and/or the aircraft 104 through one or more wired or wireless connections. As an example, the launch control unit 116 may be onboard the second lifting sub-system 110. Optionally, the launch control unit 116 may be onboard the first lifting sub-system 102 or onboard the aircraft 104. In at least one other embodiment, the launch control unit 116 may be remotely located from the aircraft 104, the first lifting sub-system 102, and the second lifting sub-system 110. The launch control unit 116 is used to control operation of the aircraft launching system 100.

In the exemplary embodiment, the first lifting sub-system 102 is or otherwise includes a crane or winch. Moreover, in the exemplary embodiment, the second lifting sub-system 110 is or includes an aircraft, such as an airship (for example, a lighter than air dirigible). Optionally the second lifting sub-system 110 can be embodied as an unmanned aerial vehicle, or one or more aircraft, such as one or more helicopters. In the exemplary embodiment, the aircraft 104 is an electric aircraft. Optionally, the aircraft 104 may be embodied as a hybrid aircraft or a non-hybrid aircraft. The aircraft 104 may be fully autonomous or pilot operated. Moreover, the aircraft 104 may be configured to transport passengers, cargo, and/or the like between locations. In at least one other embodiment, the aircraft 104 is a UAV, such as may be used to transport objects between destinations. For example, the UAV may be configured to deliver products to destinations either autonomously or based on remote operator guidance.

In operation, the aircraft 104 is taxied to the first lifting sub-system 102. In at least one embodiment, the first lifting sub-system 102 is initially on land, such as at an airport. Subsequently, the first lifting sub-system 102 is raised above ground, such as via the second lifting sub-system 110.

When the aircraft 104 is proximate to the first lifting sub-system 102, the coupler 108 is secured to the aircraft 104. After the coupler 108 is secured to the aircraft 104, thereby securing the first lifting sub-system 102 to the aircraft 104 via the first tether 106, the launch control unit 116 operates an actuating reel 118 of the first lifting sub-system 102 to retract a desired length of the first tether 106, thereby lifting the aircraft to a first altitude 120, such as a parking altitude. The first tether 106 may have a length of 1000 or more feet. Optionally, the length of the first tether 106 may be less than 1000 feet. The actuating reel 118 receives power from a power source of the first lifting sub-system 102, and/or the power source 114 of the second lifting sub-system 110 via the second tether 112.

In at least one embodiment, the first altitude 120 is an altitude at which engine noise generated by the aircraft 104 as heard at ground level is reduced. For example, the first altitude 120 may be 500 feet or more. Optionally, the first altitude 120 may be less than 500 feet. At the first altitude 120, motors and/or engines 122 of the aircraft 104 may be active. The motors 122 receive power from the power source 114 of the second lifting sub-system 110 via the first tether 106 and the second tether 112. Optionally (or additionally), the motors 122 receive power from a power source of the aircraft 104.

After the aircraft 104 is lifted to the first altitude 120, the launch control unit 116 operates the second lifting sub-system 110 to ascend so that the first lifting sub-system 102 and the aircraft 104 are each lifted to a second altitude 124, such as a launch altitude. The second altitude 124 is greater than the first altitude 120. For example, the second altitude 124 may be 30,000 feet or more above the ground.

In at least one embodiment, the second lifting sub-system 110 includes an actuating reel 126 that is configured to be controlled by the launch control unit 116 to retract the second tether 112 into the second lifting sub-system 110, and thereby lift the first lifting sub-system 102 and the aircraft 104 upwardly towards the second lifting sub-system 110.

At the second altitude 124, the aircraft 104 is operated to reach a launch airspeed (that is, an airspeed at which the aircraft 104 is able to fly on its own). In at least one embodiment, the first tether 106 is extended from the first lifting sub-system 102 to allow the aircraft 104 to fly in a radial pattern in relation to the first lifting sub-system 102 until the aircraft 104 reaches the launch airspeed, at which point the aircraft 104 detaches or otherwise releases from the coupler 108 and launches from the first tether 106. That is, the aircraft 104 is operated at the second altitude 124 to reach the launch airspeed, and detach from the first tether 106 after reaching the launch airspeed. The second lifting sub-system 110 remains at a fixed position and altitude as the aircraft 104 reaches the launch airspeed. Optionally, the second lifting sub-system 110 may move in response to the aircraft 104, such as by being pulled by motion of the aircraft 104. In at least one embodiment, the first lifting sub-system 102 remains at a fixed position and altitude as the aircraft 104 reaches the launch airspeed. Optionally, the first lifting sub-system 102 may move in response to the aircraft 104, such as by being pulled by the motion of the aircraft 104.

In at least one embodiment, the first tether 106 is selectively deployable in relation to (that is, extended from and retracted into, as desired) the first lifting sub-system 102. In at least one embodiment, the second tether 112 is selectively deployable in relation to the second lifting sub-system 110. In at least one embodiment, the launch control unit 116 operates the first lifting sub-system 102 and the second lifting sub-system 110 to control a length of the first tether 106 deployed from the first lifting sub-system 102, and a length of the second tether 112 deployed from the second lifting sub-system 110.

As such, the aircraft launching system 100 allows for the aircraft 104 to launch therefrom, without the need for a runway, thereby reducing an overall size footprint of an airport or other launch location. Also, the aircraft launching system 100 reduces aircraft noise at ground level, as the aircraft 104 is lifted to an altitude above the ground (such as the second altitude 124) at which the motors 122 are operated to gain airspeed. Moreover, during a launching process, the aircraft 104 may be powered through the power source 114 of the second lifting sub-system 110, thereby allowing for reduced power source weight aboard the aircraft 104. In particular, the electrical capacity of the onboard batteries in the aircraft 104 can used to extend a flight duration of the aircraft or enable the aircraft to carry a heavier payload rather than being expended during tax and takeoff.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the launch control unit 116 may be or include one or more processors that are configured to control operation thereof, as described herein.

The launch control unit 116 is configured to execute a set of instructions that are stored in one or more data storage units or elements (such as one or more memories), in order to process data. For example, the launch control unit 116 may include or be coupled to one or more memories. The data storage units may also store data or other information as desired or needed. The data storage units may be in the form of an information source or a physical memory element within a processing machine.

The set of instructions may include various commands that instruct the launch control unit 116 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the launch control unit 116. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the launch control unit 116 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
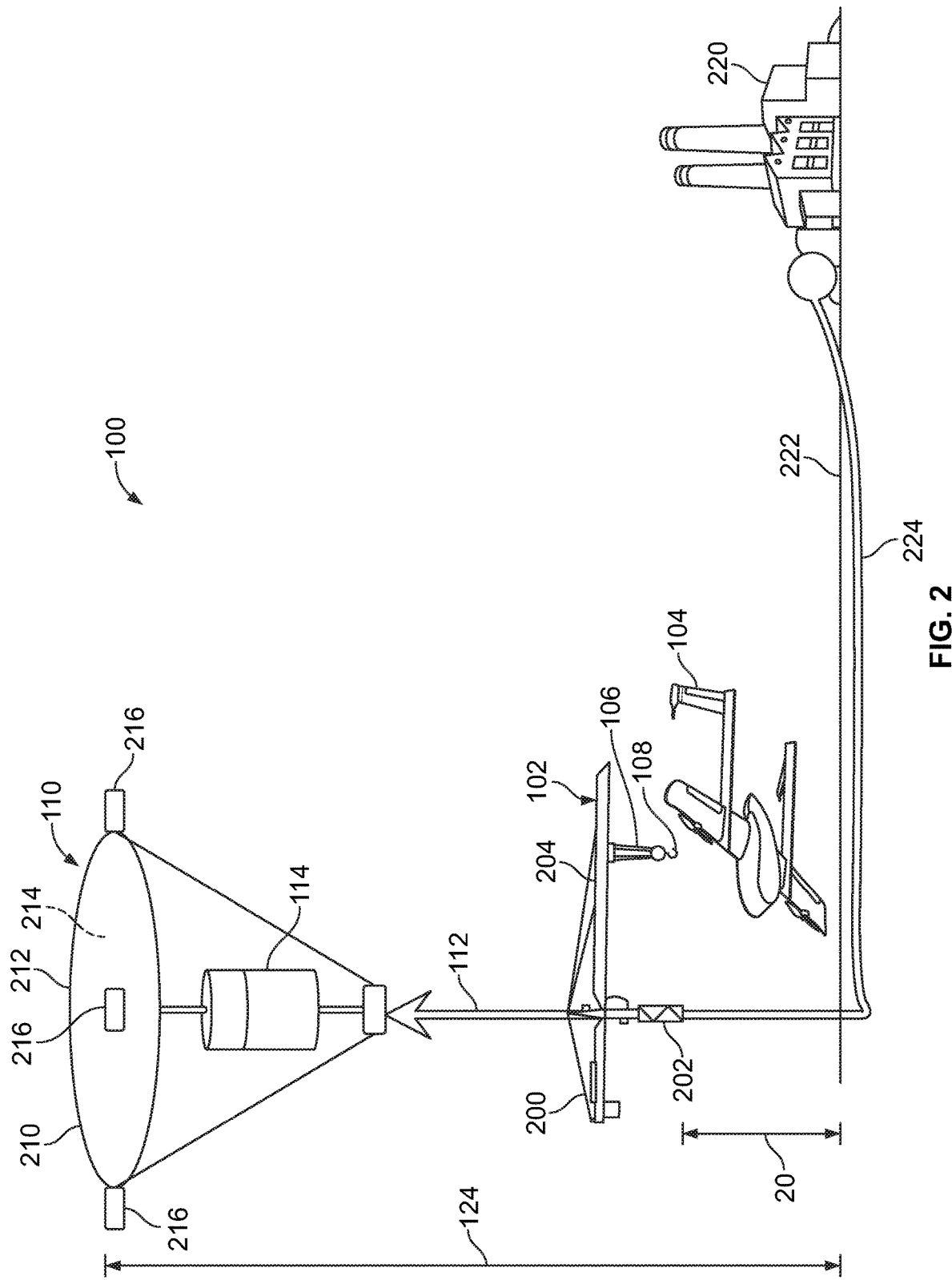
FIG. 2 illustrates a schematic diagram of the aircraft launching system in which an aircraft is taxied to a first lifting sub-system, according to an embodiment of the present disclosure.

FIG. 2 illustrates a schematic diagram of the aircraft launching system 100 in which the aircraft 104 is taxied to the first lifting sub-system 102, according to an embodiment of the present disclosure. In this embodiment, the first lifting sub-system 102 is a crane 200 including a main column 202 coupled to a boom 204. The first tether 106 moveably extends from the boom 204. Optionally, the crane 200 may not include a boom or a counterweight. The crane 200 is configured to hoist the aircraft 104 up off the ground. In at least one other embodiment, the first lifting sub-system 102 may be integral with the second lifting sub-system 110. For example, the first lifting sub-system 100 may be a winch integrated into the second lifting sub-system 110.

Also, in this embodiment, the second lifting sub-system 110 is an airship 210 (for example, a dirigible) including a main body 212 filled with a lighter-than-air gas 214, and one or more fans 216 secured to the main body 212. The power source 114 may be one or more batteries. The fans 216 are operated by the launch control unit 116 (shown in FIG. 1) to allow the airship 210 to ascend and descend, as desired.

As shown, the power source 114 is electrically coupled to a main power source 220, such an electrical grid, which is on land 222. For example, a detachable main power cable 224, which may be thousands of feet long, couples to the second tether 112 and/or directly to the power source 114. In this way, the power source 114 may be repeatedly recharged by the main power source 220. Optionally, the power source 114 may not couple to the main power source 220.

The crane 200 may be initially on the land 222, or may be suspended above the land 222 by the airship 210. In operation, the aircraft 104 is coupled to the crane 200 via the coupler 108. After the aircraft 104 is coupled to the first tether 106 of the crane 200, the crane 200 is operated (such as by the launch control unit 116) to lift the aircraft 104 to the first altitude 120 (shown in FIG. 1).

Figure 3:
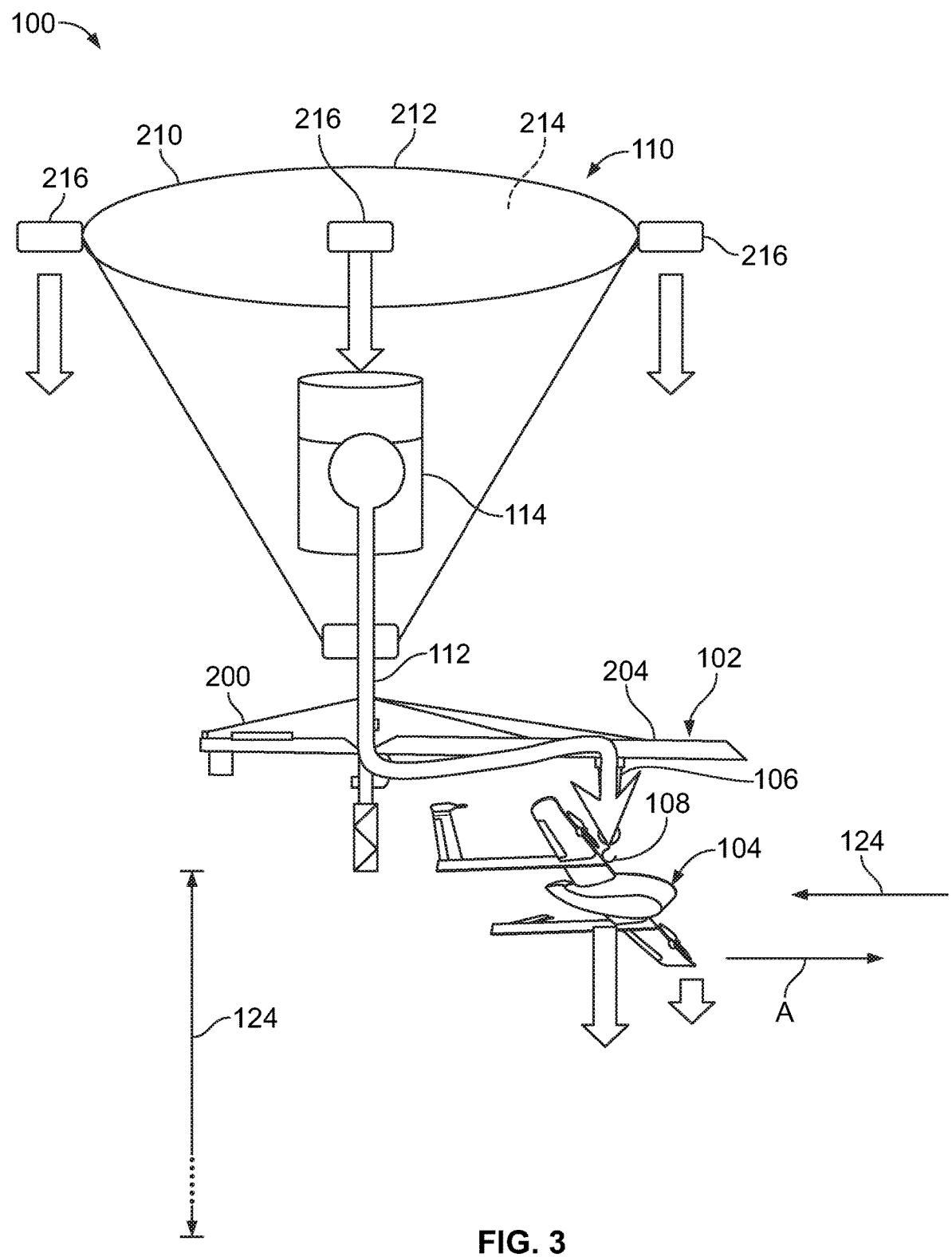
FIG. 3 illustrates a schematic diagram of the aircraft launching system in which the aircraft is at a launch altitude, according to an embodiment of the present disclosure.

FIG. 3 illustrates a schematic diagram of the aircraft launching system 100 in which the aircraft 104 is at the launch altitude (that is, the second altitude 124), according to an embodiment of the present disclosure. After the aircraft 104 is lifted by the crane 200 to the first altitude 120 (shown in FIG. 1), the launch control unit 116 (shown in FIG. 1) operates the fans 216 of the airship 210 to raise the crane 200 and the aircraft 104 to the second altitude 124 (that is, the altitude at which the aircraft 104 is located). At the second altitude 124, the launch control unit 116 operates the crane 200 to deploy additional length of the first tether 106 from the boom 204. The aircraft 104 may receive power from the power source 114 and be operated to reach the launch airspeed. As the aircraft 104 increases airspeed, the aircraft 104 may radially fly in relation to the crane 200 via the first tether 106. After reaching the launch airspeed, the aircraft 104 detaches from the coupler 108 and is launched.

Optionally, the aircraft 104 may move in the direction of arrow A (for example, a straight-line direction) to reach the launch airspeed. As the aircraft 104 moves in the direction of arrow A, the first lifting sub-system 102 and the second lifting sub-system 110 may move in response thereto.

In operation, the second lifting sub-system 110 is initially positioned at the first altitude 120. The tether 112 is extended to the ground wherein the aircraft 104 is subsequently coupled to the tether 112. The tether 112 is retracted using the actuating reel 126 such that aircraft 104 is proximate to second lifting sub-system 110. In the exemplary embodiment, the second lifting sub-system 110 is a lighter-than-air aircraft. Once the aircraft 104 is proximate to the second lifting sub-system 110, the second lifting sub-system 110 is operated such that both the second lifting sub-system 110 and the aircraft 104 are raised to the second altitude 124 that is greater than the first altitude. At the second altitude 124 the aircraft 104 is launched as described above.

Figure 4:
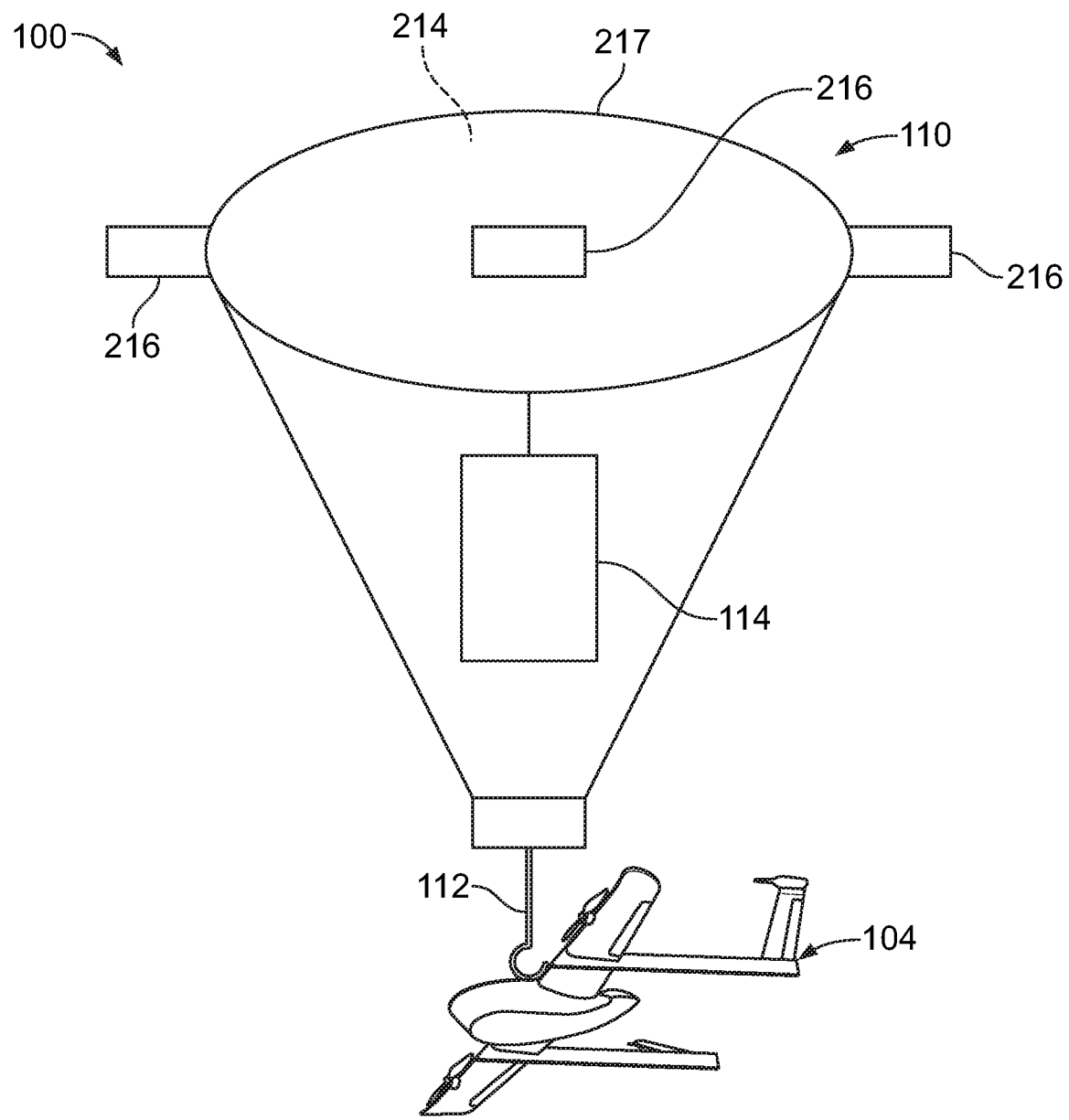
FIG. 4 illustrates a schematic diagram of another exemplary aircraft launching system that can be utilized to launch aircraft.

FIG. 4 is another exemplary aircraft launching system 100 that can be utilized to launch aircraft 104. The aircraft launching system 100 is substantially similar to those shown and described in FIGS. 1-3, but does not include the first lifting sub-system 102. In this embodiment, because the second lifting sub-system 110 lifts the aircraft 104 to the first altitude 120 and the second altitude 124, the second lifting sub-system 110 is a single (or first) lifting sub-system. In at least one other embodiment, the second lifting sub-system 100 may include an additional lifting sub-system, such as a crane, winch, or the like.

Figure 5:
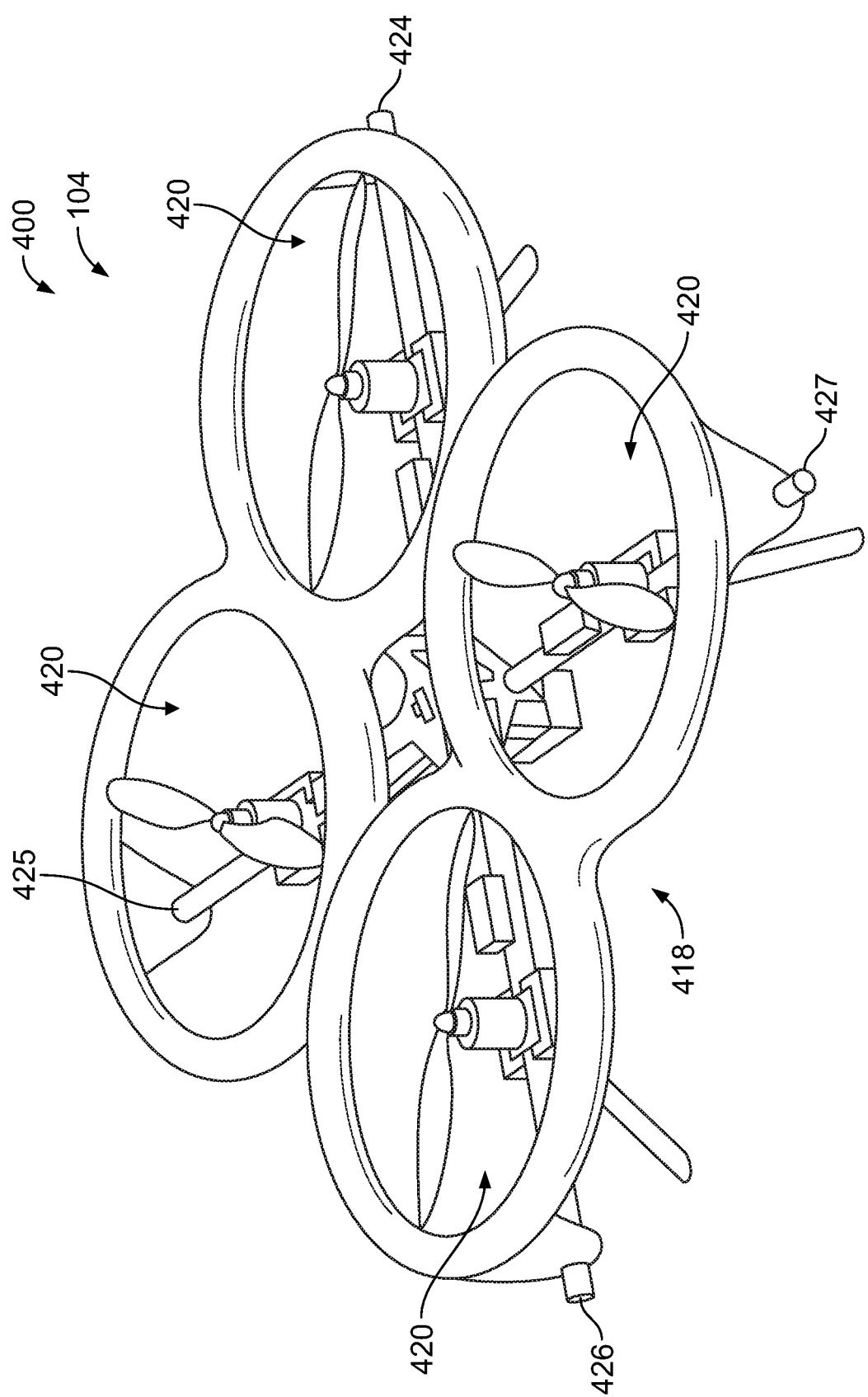
FIG. 5 illustrates another exemplary aircraft that may be launched using the system described in FIGS. 1-4.

FIG. 5 illustrates a perspective top view of another exemplary aircraft 104 that can be launched using aircraft launching system 100. In this embodiment, the aircraft 104 is an unmanned aerial vehicle (UAV) 400. The UAV 400 includes an airframe 418 and a plurality of propulsion systems 420 coupled to the airframe 418. In general, the airframe 418 forms the structural body or framework for the UAV 400. In the illustrated embodiment shown in FIG. 5, the UAV 400 includes four propulsion systems 420, such that each propulsion system 420 is mounted to a respective arm 424, 425, 426, and 427. In the illustrated embodiment, the UAV 400 includes four arms 424-427 and a single propulsion system 420 that is mounted to each respective arm 424-427. Optionally, the UAV 400 may include more or less propulsion systems 420, more or less propulsion systems 420 per arm 424-427, and more or less arms 424-427 than shown.

Also, optionally, instead of the UAV shown in FIG. 5, the UAV 400 may include a fuselage, wings, a tail, and the like. In this manner, the UAV 400 may be designed as an unmanned airplane.

Referring to FIGS. 1-5, in at least one embodiment, the launch control unit 116 may first check for a ground power connection, such as via the main power cable 224. If there is a ground power connection, the power source 114 may be charged via the main power source 220.

Next, the launch control unit 116 may check to determine whether the aircraft 104 is connected to the first lifting sub-system 102, such as through the coupler 108. The coupler 108 may output a connection signal as it couples to a reciprocal portion of the aircraft 104.

If the aircraft 104 is coupled to the coupler 108, the launch control unit 116 operates the first lifting sub-system 102 to lift (for example, hoist and/or ascend) the aircraft 104 to the first altitude 120. After the aircraft 104 reaches the first altitude 120, the second lifting sub-system 110 is operated by the launch control unit 116 to lift (such as via ascending) the aircraft 104 to the second altitude 124. One or both of the first tether 106 and/or the second tether 112 may then be deployed (for example, extended) to allow the aircraft 104 to radially accelerate in relation to the first lifting sub-system 102 and/or the second lifting sub-system 110 until reaching the launch airspeed. After reaching the launch airspeed, the aircraft 104 detaches from the coupler 108, and is launched into independent flight.

Figure 6:
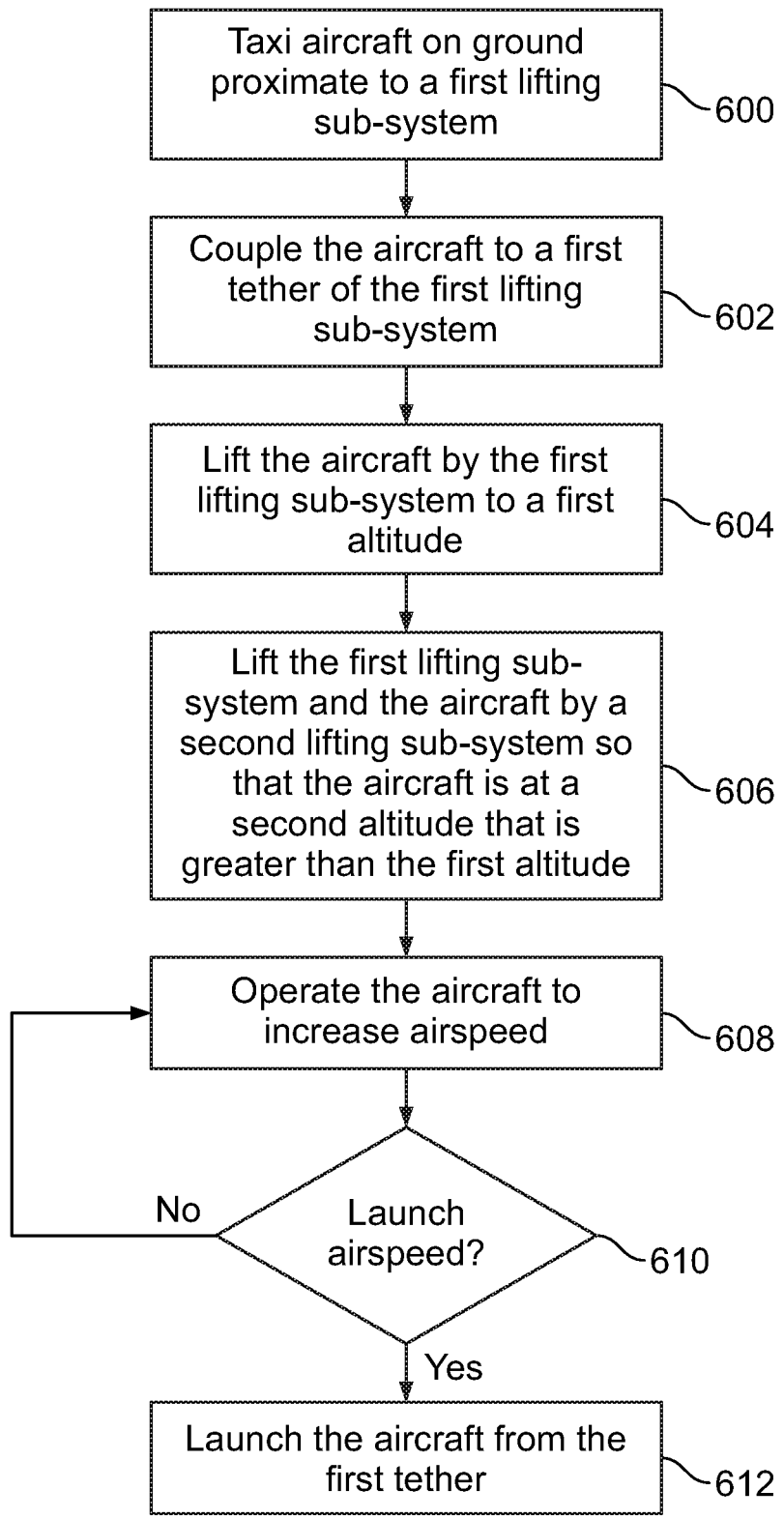
FIG. 6 illustrates a flow chart of an aircraft launching method, according to an embodiment of the present disclosure.

FIG. 6 illustrates a flow chart of an aircraft launching method, according to an embodiment of the present disclosure. Referring to FIGS. 1 and 6, at 600, the aircraft 104 first taxis on the ground to a location proximate to the first lifting sub-system 102. At 602, the aircraft 104 is coupled to the first tether 106 of the first lifting sub-system 102, such as via the coupler 108.

At 604, the first lifting sub-system 102 is operated, such as via the launch control unit 116, to lift the aircraft 104 to the first altitude 120. At 606, after the aircraft 104 has reached the first altitude 120, the second lifting sub-system 110 is operated, such as via the launch control unit 116, to lift the first lifting sub-system 102 and the aircraft 104 so that the aircraft 104 is at the second altitude 124, which exceeds the first altitude 120.

At 608, at the second altitude 124, the aircraft 608 is operated to increase airspeed while tethered to the first lifting sub-system 102 by the first tether 106. At 610, it is determined if the aircraft 104 has reached the launch airspeed. For example, a pilot of aircraft may make such determination, or the launch control unit 116 may automatically make such determination (such as by monitoring one or more airspeed sensors of the aircraft 104). If the launch airspeed has not been attained, the process returns to 608. If, however, the launch airspeed has been attained at 610, the method proceeds to 612, at which the aircraft 104 is launched from the first tether 106, such as by uncoupling from the coupler 108 (via pilot command, or automatic operation as controlled by the launch control unit 116).

As described herein, embodiments of the present disclosure provide aircraft launching systems and methods that allow aircraft to depart from a location that takes up less space than a traditional runway. Further, embodiments of the present disclosure provide aircraft launching systems and methods that reduce aircraft noise at ground level. Additionally, embodiments of the present disclosure provide aircraft launching systems and methods that reduce weight of an energy source, such as batteries, of on aircraft, as the aircraft may be powered via another power source (such as of a lifting sub-system and/or a main power source) prior to being launched.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft launching system, comprising:
a first lifting sub-system including a first tether that removably couples to an aircraft, wherein the first tether is selectively deployable in relation to the first lifting sub-system; and
a second lifting sub-system including a second tether that couples the first lifting sub-system to the second lifting sub-system, wherein the second tether is selectively deployable in relation to the second lifting sub-system,
wherein the first lifting sub-system is configured to independently lift the aircraft to a first altitude off and above ground, and
wherein the second lifting sub-system is configured to lift the first lifting sub-system and the aircraft off and above the ground so that the aircraft is at a second altitude that is greater than the first altitude.

2. The aircraft launching system of claim 1, wherein the aircraft is operated to reach a launch airspeed at the second altitude and detach from the first tether after reaching the launch airspeed.

3. The aircraft launching system of claim 1, further comprising a power source that supplies power to one or both of the first lifting sub-system or the second lifting sub-system.

4. The aircraft launching system of claim 3, wherein the second lifting sub-system comprises the power source.

5. The aircraft launching system of claim 3, wherein the aircraft receives power from the power source.

6. The aircraft launching system of claim 3, wherein the power source comprises one or more batteries.

7. The aircraft launching system of claim 1, wherein the first lifting sub-system comprises a crane, and the second lifting sub-system comprises a drone.

8. The aircraft launching system of claim 1, wherein the at least one lifting sub-system comprises an airship.

9. The aircraft launching system of claim 1, wherein the aircraft is an unmanned aerial vehicle.

10. The aircraft launching system of claim 1, wherein the first lifting sub-system further includes an actuating reel coupled to the first tether, and wherein the actuating reel is operated to retract a length of the first tether to lift the aircraft to the first altitude.

11. The aircraft launching system of claim 1, wherein the first tether is configured to be extended from the first lifting sub-system to allow the aircraft to fly in a radial pattern in relation to the first lifting sub-system until the aircraft reaches a launch airspeed, wherein the aircraft releases from the first tether at the launch airspeed.

12. An aircraft launching method, comprising:
removably coupling an aircraft to a first tether of a first lifting sub-system;
coupling the first lifting sub-system to a second tether of a second lifting sub-system;
lifting, independently by the first lifting sub-system, the aircraft to a first altitude off and above ground;

lifting, by the second lifting sub-system, the first lifting sub-system and the aircraft off and above the ground so that the aircraft is at a second altitude that is greater than the first altitude;

selectively deploying the first tether in relation to the first lifting sub-system; and selectively deploying the second tether in relation to the second lifting sub-system.

13. The aircraft launching method of claim 12, further comprising operating the aircraft to reach a launch airspeed at the second altitude and detach from the first tether after reaching the launch airspeed.

14. The aircraft launching method of claim 12, further comprising supplying power, by a power source of the second lifting sub-system, to the first lifting sub-system, the second lifting sub-system, and the aircraft.

15. The aircraft launching method of claim 12, wherein the first lifting sub-system comprises a crane, and the second lifting sub-system comprises an airship.

16. The aircraft launching method of claim 12, wherein said lifting, by the first lifting sub-system, includes operating an actuating reel coupled to the first tether, to retract a length of the first tether to lift the aircraft to the first altitude.

17. The aircraft launching method of claim 12, further comprising:

extending the first tether from the first lifting sub-system to allow the aircraft to fly in a radial pattern in relation to the first lifting sub-system until the aircraft reaches a launch airspeed; and releasing the aircraft from the first tether at the launch airspeed.

18. An aircraft launching system, comprising:

a first lifting sub-system including a first tether that removably couples to an aircraft, wherein the first tether is selectively deployable in relation to the first lifting sub-system;

a second lifting sub-system including a second tether that couples the first lifting sub-system to the second lifting sub-system, wherein the second tether is selectively deployable in relation to the second lifting sub-system; and a power source that supplies power to one or both of the first lifting sub-system or the second lifting sub-system, wherein the aircraft receives power from the power source, wherein the first lifting sub-system is configured to independently lift the aircraft off and above ground to a first altitude, wherein the second lifting sub-system is configured to lift the first lifting sub-system and the aircraft off and above the ground so that the aircraft is at a second altitude that is greater than the first altitude, wherein the aircraft is operated to reach a launch airspeed at the second altitude and detach from the first tether after reaching the launch airspeed.

19. The aircraft launching system of claim 18, wherein the second lifting sub-system comprises the power source.

20. The aircraft launching system of claim 18, wherein the first lifting sub-system comprises a crane, and the second lifting sub-system comprises a drone.

21. The aircraft launching system of claim 18, wherein the at least one lifting sub-system comprises an airship.

* * * * *